United States Patent
Kantzes et al.

(10) Patent No.: US 8,725,081 B2
(45) Date of Patent: May 13, 2014

(54) WIRELESS PROCESS COMMUNICATION ADAPTER FOR HANDHELD FIELD MAINTENANCE TOOL

(75) Inventors: Christopher Kantzes, Minneapolis, MN (US); Brad N. Mathiowetz, Lakeville, MN (US); Alden C. Russell, Minnetonka, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1028 days.

(21) Appl. No.: 11/974,917

(22) Filed: Oct. 16, 2007

(65) Prior Publication Data

US 2008/0268784 A1 Oct. 30, 2008

Related U.S. Application Data

(60) Provisional application No. 60/923,462, filed on Apr. 13, 2007.

(51) Int. Cl.
*H04B 7/00* (2006.01)

(52) U.S. Cl.
USPC ....... 455/66.1; 455/41.2; 455/41.3; 455/90.1; 370/310

(58) Field of Classification Search
USPC .............. 455/66.1, 67.11, 41.2, 41.3, 90.1
See application file for complete search history.

(56) References Cited

U.S. PATENT DOCUMENTS

| | | | |
|---|---|---|---|
| 5,442,639 A | 8/1995 | Crowder et al. | 371/20.1 |
| 6,211,649 B1 | 4/2001 | Matsuda | 320/115 |
| 6,377,859 B1 | 4/2002 | Brown et al. | 700/79 |
| 6,690,749 B2 * | 2/2004 | Townshend | 375/340 |
| 7,421,531 B2 | 9/2008 | Rotvold et al. | 710/305 |
| 2002/0167904 A1 * | 11/2002 | Borgeson et al. | 370/241 |
| 2003/0229472 A1 | 12/2003 | Kantzes | 702/90 |
| 2004/0039458 A1 * | 2/2004 | Mathiowetz et al. | 700/17 |
| 2004/0073402 A1 * | 4/2004 | DelaCruz et al. | 702/183 |
| 2004/0111238 A1 | 6/2004 | Kantzes et al. | 702/183 |

(Continued)

FOREIGN PATENT DOCUMENTS

| | | |
|---|---|---|
| EP | 1489476 A2 | 12/2004 |
| GB | 2 394 124 | 4/2004 |
| WO | WO 2009/003146 | 12/2008 |
| WO | WO 2009/003148 | 12/2008 |

OTHER PUBLICATIONS

International Search Report and Written Opinion from application PCT/US2008/004503, filed Apr. 8, 2008.

(Continued)

*Primary Examiner* — Nay A Maung
*Assistant Examiner* — Erica Fleming-Hall
(74) *Attorney, Agent, or Firm* — Christopher R. Christenson; Kelly, Holt & Christenson, P.L.L.C.

(57) ABSTRACT

A wireless process communication adapter is provided. The adapter includes a plurality of plugs that are coupleable to a handheld field maintenance tool. A loop communication module is operably coupled to the plurality of plugs. The loop communication module is configured to communicate digitally in accordance with a process loop communication standard protocol. A controller is coupled to the loop communication module, and is configured to transform at least one message received from the loop communication module to at least one corresponding wireless protocol packet. A wireless communication module is coupled to the controller and configured to receive the at least one corresponding wireless protocol packet and generate a wireless signal based upon the at least one wireless protocol packet.

15 Claims, 6 Drawing Sheets

(56) References Cited

U.S. PATENT DOCUMENTS

| | | | |
|---|---|---|---|
| 2004/0162027 A1* | 8/2004 | Chang | 455/41.2 |
| 2004/0218326 A1* | 11/2004 | Duren et al. | 361/93.1 |
| 2004/0228184 A1 | 11/2004 | Mathiowetz | 365/202 |
| 2004/0230327 A1* | 11/2004 | Opheim et al. | 700/83 |
| 2004/0230401 A1 | 11/2004 | Duren et al. | 702/184 |
| 2004/0260405 A1* | 12/2004 | Eddie et al. | 700/3 |
| 2005/0114086 A1 | 5/2005 | Zielinski et al. | 702/184 |
| 2005/0228509 A1 | 10/2005 | James | 700/19 |
| 2005/0245291 A1* | 11/2005 | Brown et al. | 455/572 |
| 2006/0092039 A1* | 5/2006 | Saito et al. | 340/825.37 |
| 2006/0128199 A1* | 6/2006 | Hedtke | 439/320 |
| 2006/0161393 A1* | 7/2006 | Zielinski et al. | 702/184 |
| 2006/0192671 A1 | 8/2006 | Isenmann et al. | 340/531 |
| 2006/0291438 A1* | 12/2006 | Karschnia et al. | 370/338 |
| 2007/0233283 A1* | 10/2007 | Chen | 700/17 |
| 2007/0237137 A1* | 10/2007 | McLaughlin | 370/389 |
| 2007/0243830 A1* | 10/2007 | Isenmann et al. | 455/67.11 |
| 2008/0114911 A1 | 5/2008 | Schumacher | 710/72 |
| 2008/0126665 A1* | 5/2008 | Burr et al. | 710/316 |
| 2008/0183935 A1* | 7/2008 | Guenter et al. | 710/305 |
| 2008/0189441 A1* | 8/2008 | Jundt et al. | 710/3 |
| 2009/0193169 A9* | 7/2009 | Guenter et al. | 710/305 |

OTHER PUBLICATIONS

The first Office Action from the related Chinese patent application No. 200880011865.0 dated Mar. 16, 2011.
The second Office Action from the related Chinese patent application No. 200880011865.0 dated Mar. 21, 2012.
Rejection Notice from the related Japanese patent application No. 2010503029 dated Sep. 19, 2012.
Rejection Notice from the related Japanese patent application No. 2010503029 dated May 23, 2012.
Examination Report from the related European patent application No. 087426185 dated Jul. 30, 2012.
Rejection Decision from the related Chinese patent application No. 2008800118650 dated Aug. 3, 2012.
Technical Data Sheet: VIATOR® USB HART® Interface (Model 010031). MACTek Measurement and Control Technologies. Revised Jan. 24, 2004.
VIATOR® Bluetooth® Wireless Technology Interface for use with HART field devices. MACTek Measurement and Control Technologies retrieved from www.mactekcorp.com/product5.htm on Mar. 13, 2009.
Product Data Sheet: VIATOR RS232. MACTek Measurement and Control Technologies retrieved from www.mactekcorp.com/productl.htm on Mar. 13, 2009.

\* cited by examiner

WIRELESS PROCESS COMMUNICATION ADAPTER FOR HANDHELD FIELD MAINTENANCE TOOL

CROSS-REFERENCE TO RELATED APPLICATION

The present application is based on and claims the benefit of U.S. provisional patent application Ser. No. 60/923,462, filed Apr. 13, 2007, the content of which is hereby incorporated by reference in its entirety.

BACKGROUND OF THE INVENTION

Handheld field maintenance tools are known. Such tools are highly useful in the process control and measurement industry to allow operators to conveniently communicate with and/or interrogate field devices in a given process installation. Examples of such process installations include petroleum, pharmaceutical, chemical, pulp, and other fluid processing installations. In such installations, the process control and measurement network may include tens or even hundreds of various field devices which periodically require maintenance to ensure that such devices are functioning properly and/or calibrated. Moreover, when one or more errors in the process control and measurement installation are detected, the use of a handheld field maintenance tool allows technicians to quickly diagnose such errors in the field.

Since at least some process installations may involve highly volatile, or even explosive, environments, it is often beneficial, or even required, for field devices and the handheld field maintenance tools used with such field devices to comply with intrinsic safety requirements. These requirements help ensure that compliant electrical devices will not generate a source of ignition even under fault conditions. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research October, 1998. An example of a handheld field maintenance tool that complies with intrinsic safety requirements includes that sold under trade designation Model 375 Field Communicator, available from Fisher-Rosemount Systems, Inc. of Eden Prairie, Minn.

Given the unique environmental considerations for field devices, communication signaling has traditionally been carefully controlled. Examples of industrial process communication protocols include the Highway Addressable Remote Transducer (HART®) Protocol, and the FOUNDATION™ Fieldbus Protocol.

The HART® Communication Protocol has a hybrid physical layer consisting of digital communication signals superimposed on the standard 4-20 mA analog signal. The data transmission rate is 1.2 Kbits/sec. The HART® Protocol is a de facto standard in the process industries.

Another major process industry communication protocol is known as the FOUNDATION™ Fieldbus Communication Protocol. This protocol is based on an ISA standard (ISA—S50.01-1992, promulgated by the Instrument Society of America in 1992). A practical implementation was specified by the Fieldbus Foundation (FF). FOUNDATION™ Fieldbus is an all digital communication protocol with a transmission rate of approximately 31.25 Kbits/sec.

Recently, some field devices have been designed to communicate wirelessly. These field devices, accordingly, do not require any communication or power wiring thereby simplifying field wiring, as well as interaction with the device. However, handheld field maintenance tools with terminals that are designed to physically couple to wiring terminals of a field device are simply not able to communicate with these new wireless field devices.

SUMMARY OF THE INVENTION

A wireless process communication adapter is provided. The adapter includes a plurality of plugs that are coupleable to a handheld field maintenance tool. A loop communication module is operably coupled to the plurality of plugs. The loop communication module is configured to communicate digitally in accordance with a process loop communication standard protocol. A controller is coupled to the loop communication module, and is configured to transform at least one message received from the loop communication module to at least one corresponding wireless protocol packet. A wireless communication module is coupled to the controller and configured to receive the at least one corresponding wireless protocol packet and generate a wireless signal based upon the at least one wireless protocol packet.

DETAILED DESCRIPTION OF ILLUSTRATIVE EMBODIMENTS

Figure 1A:
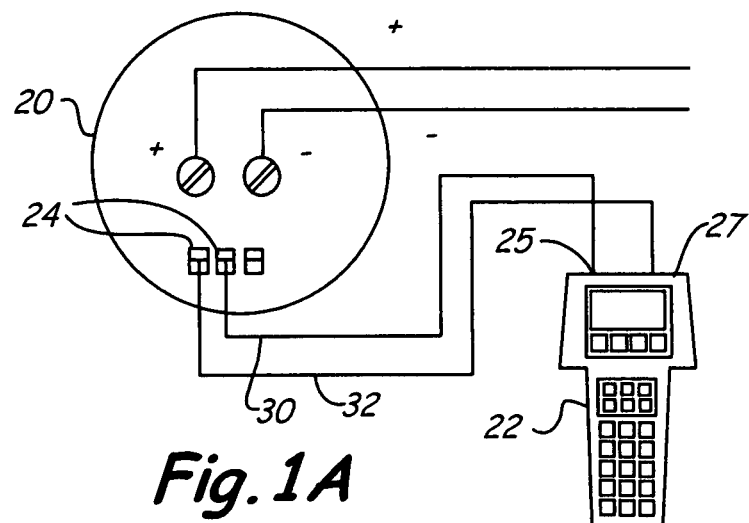
FIGS. 1A and 1B are diagrammatic views of a handheld field maintenance tool coupled to a field device in accordance with the prior art.
Figure 1B:
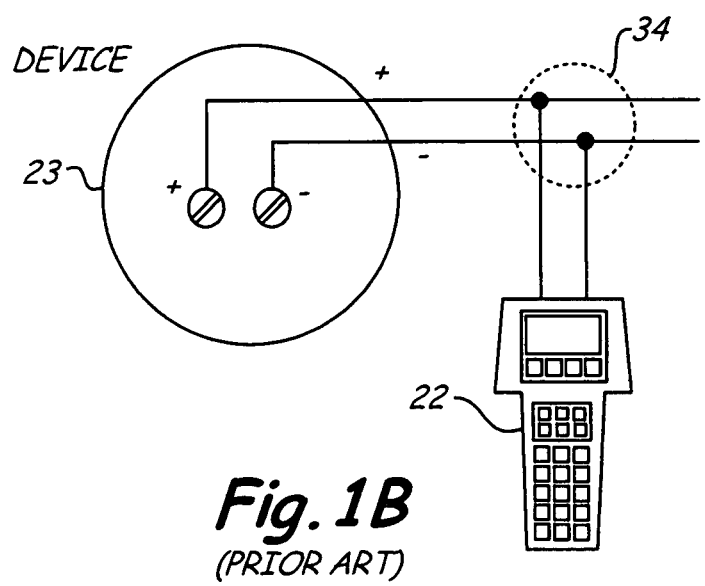

FIGS. 1A and 1B are diagrammatic views of a handheld field maintenance tool 22 coupled to field devices in accordance with the prior art. As shown in FIG. 1A, handheld field maintenance tool 22 includes a pair of terminals 25, 27 that couple to test leads 30, 32, respectively, which are then coupled to terminals 24 of field device 20. Terminals 24 may be dedicated terminals to allow such a handheld field maintenance tool to couple to device 20 and interact with device 20.

FIG. 1B shows an alternate arrangement where handheld field maintenance tool 22 couples directly to the process control loop 34 to which field device 23 is coupled. In either case, the wired connection between the handheld field maintenance tool and the field device allows the handheld field maintenance tool to interact with the desired field device 20, 23.

In applications where the field devices communicate in accordance with the HART® communication protocol, the handheld field maintenance tool would act as a HART® master in the communication arrangement. Handheld HART® masters, such as device 22 are widely used in the workplace today. HART® masters have a pair of communication terminals, which when connected via wired lead sets to a HART® loop, or directly to a HART® device, enable wired communication with the connected device. However, due to hardware constraints, HART® masters, such as handheld field maintenance device 22 are not able to communicate wirelessly to a wireless field device (such as a pressure transmitter, valve positioner, et cetera).

Figure 2:
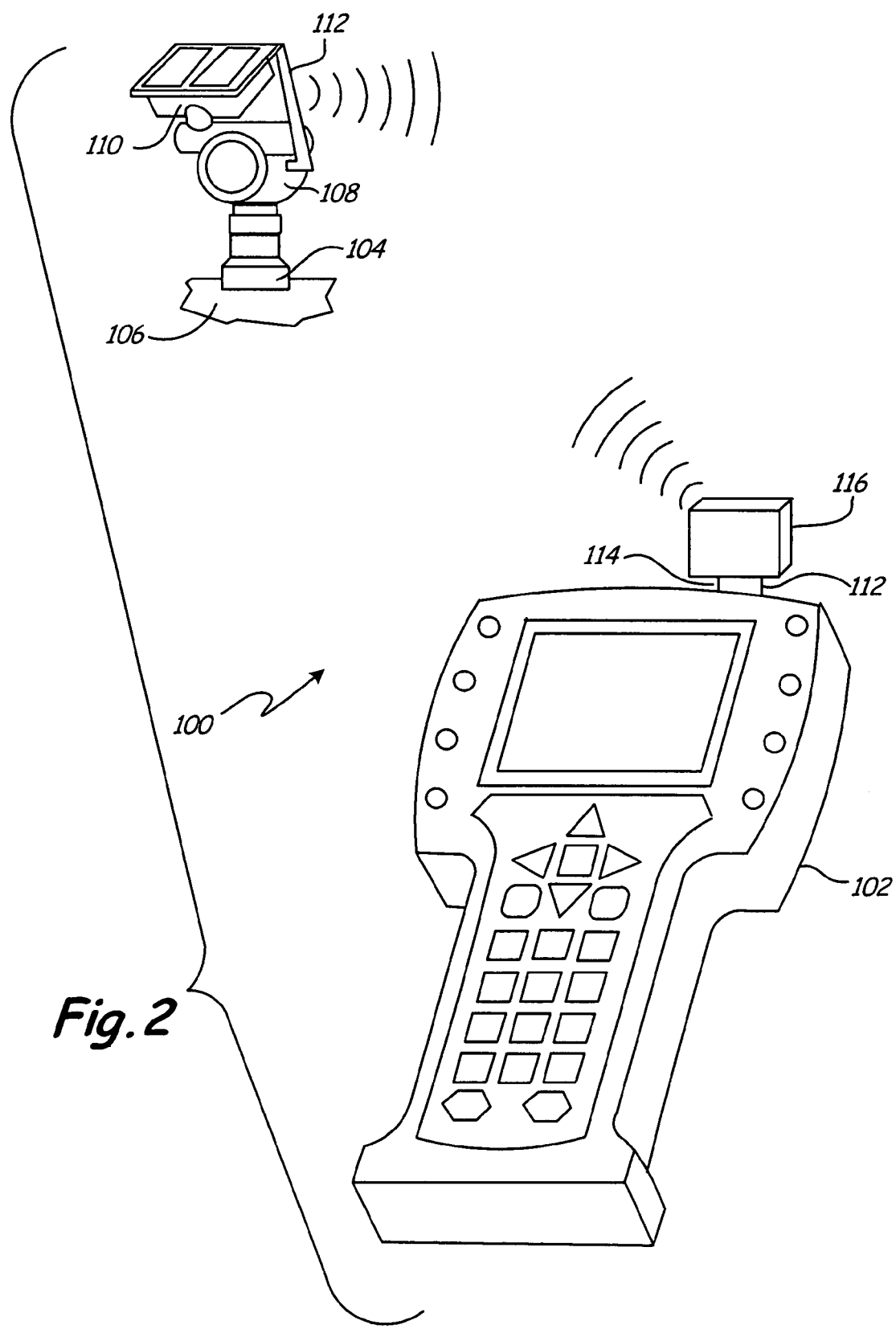
FIG. 2 is a diagrammatic view of a handheld field maintenance tool communicating with a wireless field device in accordance with an embodiment of the present invention.

FIG. 2 is a diagrammatic view of a handheld field maintenance tool interacting with a wireless field device in accordance with an embodiment of the present invention. System 100 includes handheld field maintenance tool 102 communicating with wireless field device 104. Wireless field device 104 is depicted as an industrial process fluid pressure transmitter having a pressure manifold 106 coupled thereto, and an electronics enclosure 108. The electronics enclosure 108 is further coupled to a source of energy (solar cell 110) and includes a wireless communication module communicating wirelessly through antenna 112. Wireless field device 104 is provided for illustrative purposes only. In reality, wireless field device 104 may be any industrial device, such as a process fluid pressure transmitter, process fluid temperature transmitter, process fluid level transmitter, process fluid flow transmitter, valve controller, or any other device that is useful in the measurement and/or control of industrial processes.

Wireless field device 104 communicates in accordance with a wireless process communication protocol. One example of such a protocol is the new WirelessHART standard. This standard uses wireless communication, at the 2.4 GHz frequency, but otherwise employs the same command structure as that used in Wired HART® communication. While the Wireless HART® protocol is one example of a wireless process communication protocol, other standards can be employed in accordance with embodiments of the present invention.

Handheld field maintenance tool 102 is a device that is designed to interact with field devices via a wired connection. Handheld field maintenance tool 102 includes a pair of terminals 112, 114 that couple tool 102, via test leads, to a wired field device. However, as described above, such wired connections to wireless field devices, such as device 104 are not possible.

In accordance with an embodiment of the present invention, terminals 112 and 114 of handheld field maintenance tool 102 are coupled to wireless process communication adapter 116. Accordingly, through its wired connection terminals 112, 114, handheld field maintenance tool 102 is able to send and receive signals to wireless field device 104 by virtue of employment of wireless process communication adapter 116. A command in accordance with a wired process communication protocol, such as the HART® communication protocol, issued by device 102 passes through terminals 112, 114 and is received by wireless process communication adapter 116. Wireless process communication adapter 116 transforms the communication, if necessary, into an appropriate wireless communication signal, and sends the signal to wireless field device 104. Conversely, when wireless field device 104 issues data, or some other form of response, as a wireless transmission, the transmission is received by radio frequency circuitry within wireless process communication adapter 116. The transmission is then transformed, if necessary, to a suitable wired signal in accordance with the wired process communication protocol, and sent to handheld field maintenance tool 102 through terminals 112, 114. As set forth above, the Wireless HART® Protocol is believed to use the same command structure as the wired HART® Protocol. Thus, wireless process communication adapter 116, in some embodiments, may not need to transform the data or commands prior to generating corresponding wired/wireless signals.

Figure 3:
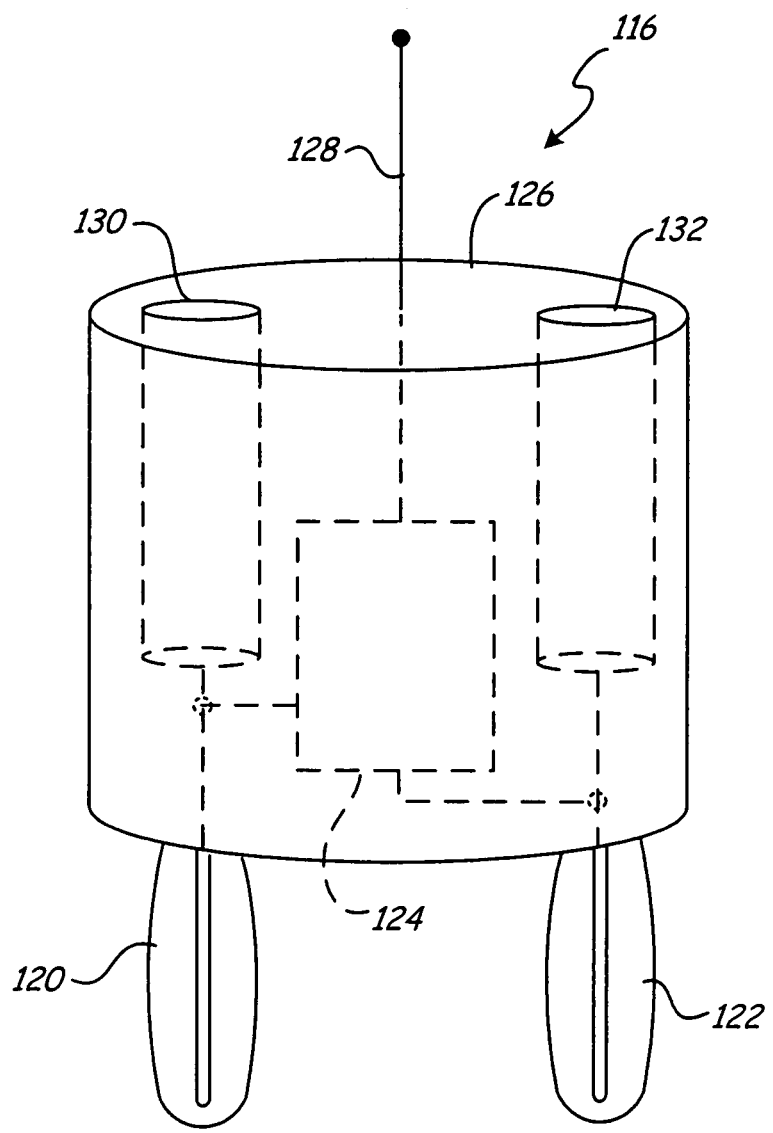
FIG. 3 is a diagrammatic view of a wireless process communication adapter in accordance with an embodiment of the present invention.

FIG. 3 is a diagrammatic view of wireless process communication adapter 116 in accordance with an embodiment of the present invention. Adapter 116 includes a pair of plugs 120, 122 that are sized and spaced to mate with the lead terminals of a handheld field maintenance tool. As illustrated in FIG. 3, the preferred form for plugs 120, 122 is that of banana plugs. Additionally, it is preferred that electronics 124 required for operation of device 116 be fully contained within a molded portion 126 that fits substantially between the width of the distance between terminals 120, 122. However, this is merely a preferred embodiment, and additional embodiments of the present invention can be practiced using a significantly larger housing or molded portion 126 and/or individual leads that couple the wireless process communication adapter 116 to an associated handheld field maintenance tool.

Electronics 124 are coupled to antenna 128 to allow electronics 124 to interact wirelessly. Additionally, in one embodiment, a pair of test lead terminals 130, 132 are provided and coupled to plugs 120, 122 such that when adapter 116 is deployed upon a handheld field maintenance tool, wired test leads can still be inserted into terminals 130, 132.

Figure 4:
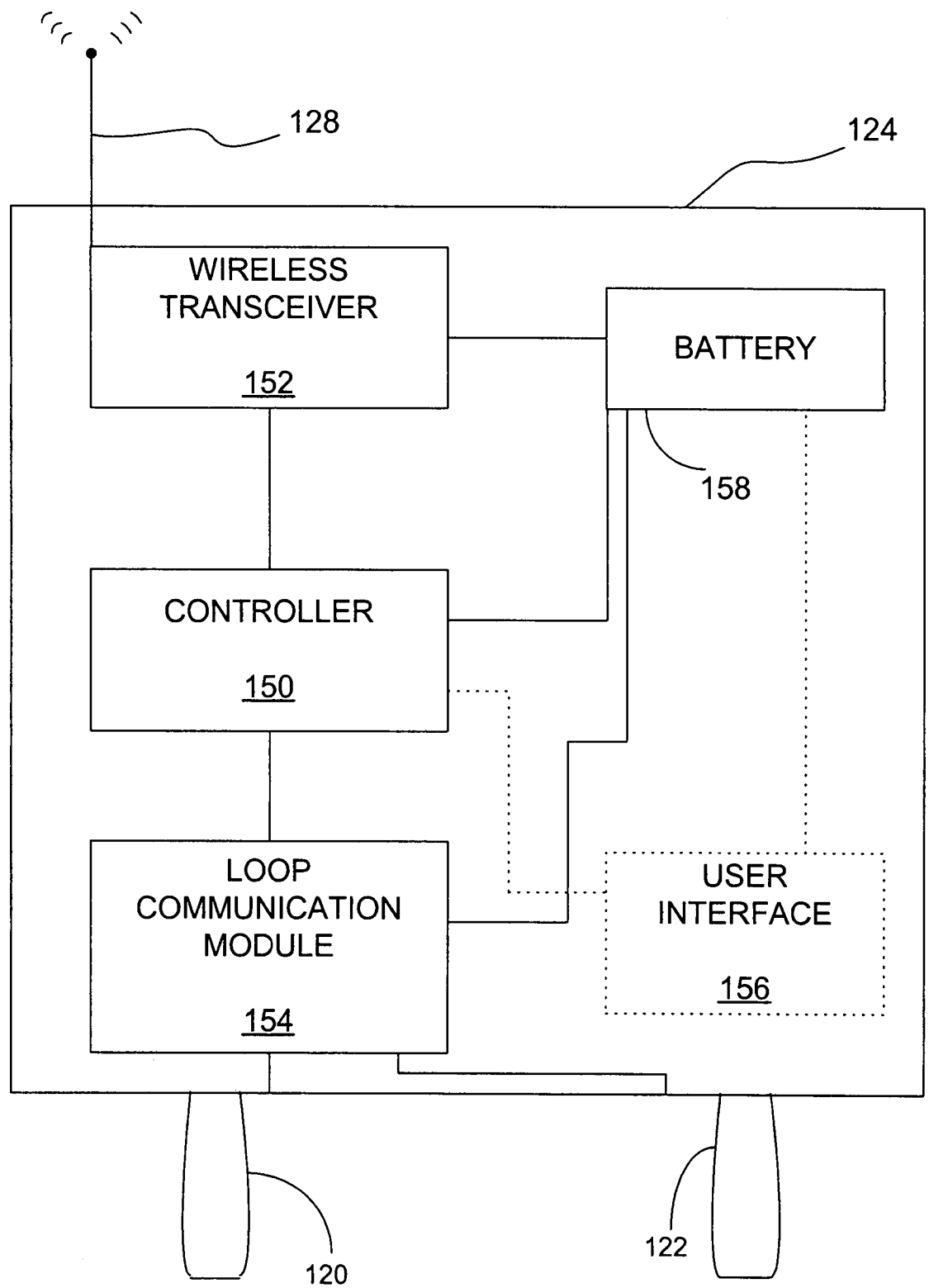
FIG. 4 is a diagrammatic view of electronic circuitry of a wireless process communication adapter in accordance with an embodiment of the present invention.

FIG. 4 is a diagrammatic view of electronics 124 within housing 126. Electronics 124 includes controller 150 coupled to wireless transceiver 152 and loop communication module 154. Controller 150 can be coupled to an optional user interface 156 disposed on, or located proximate wireless process communication adapter 116. Further, electronics 124 preferably includes an internal source of electrical energy shown as battery 158 coupled to wireless transceiver 152, controller 150, loop communication module 154, and optional user interface, if required, 156.

Wireless transceiver 152 is coupled to antenna 128 and is configured to interact with wireless field devices, and/or other handheld field maintenance tools via radio frequency communication. The radio frequency communication is preferably in accordance with a wireless process communication protocol, such as the Wireless HART® Specification published by the Hart Communication Foundation. Relevant portions of the Wireless HART® Specification include: HCF_Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155-Wireless Command Specification; and HART Specification 290—Wireless Devices Specification.

Controller 150 can include any device that is able to execute programmatic instructions to perform an intended result. Preferably, controller 150 is simply a microprocessor. Controller 150 converts incoming HART® messages received via the loop communication module 154 from the HART® master (a handheld field maintenance tool) to wireless protocol packets, and converts incoming wireless HART® packets received from a wireless HART® field device such as field device 104, to wired HART® messages for transmission to the handheld field maintenance tool. The radio transceiver 154 transmits and receives wireless HART® protocol packets. Loop communication module 154 transmits and receives wired HART® messages via plugs 120, 122.

Loop communication module 154 is coupled to plugs 120, 122 and to controller 150. Loop communication module 154 is adapted to communicate in accordance with a wired process communication protocol. For example, if wireless process communication adapter 116 is a HART® master wireless process communication adapter, then loop communication module 154 is simply a HART® MODAC. A HART® MODAC is a known device that combines the functions of a modem with a digital-to-analog converter. In one embodiment, the MODAC within loop communication module 154 can include an application specific integrated circuit (ASIC) developed by Rosemount, Inc., of Chanhassen, Minn. which includes a HART® compatible modem (a modulator and demodulator) and a digital-to-analog (D/A) converter. The MODAC can be replaced with any suitable modem and digital-to-analog converter together with the appropriate control logic. The modem within the MODAC demodulates digital messages received from the handheld field maintenance tool via plugs 120, 122, and provides the digital messages to controller 150. Digital communication circuitry 154 also receives digital messages and process variable measurements from controller 150, converts the process variable measurements and/or digital messages to suitable 4-20 mA analog signals and modulates the digital messages onto the analog signals, thereby establishing two-way communication with the handheld field maintenance tool. The term "process variable" used herein refers to a variable such as pressure, temperature, flow, level, specific gravity, et cetera, by the field device.

In embodiments where the wired process communication is in accordance with a different process communication protocol, such as FOUNDATION™ Fieldbus, loop communication module 154, is, in that embodiment, adapted for such process communication. Known technology for wired communication in accordance with the FOUNDATION™ Fieldbus process communication protocol can be used for loop communication module 154, in such embodiments. Additionally, any suitable wired process communication protocol can be accommodated by designing the wireless process communication adapter 116 to have an appropriate loop communication module 154.

Wireless process communication adapter 116 preferably includes its own source of electrical energy. Specifically, FIG. 4 illustrates battery 158 which is preferably rechargeable. Battery 158 can include known battery chemistry, such as nickel cadmium, nickel metal hydride, or lithium ion. Further, any suitable battery chemistry later developed may also be used. Battery 158 is coupled to and powers wireless transceiver 152, controller 150, loop communication module 154, and user interface 156, if such interface 156 is present.

Optional user interface 156 includes any device able to receive a local input from a user, or technician, or provide useful information to the technician. Suitable examples of user inputs include buttons, a keypad, a microphone, or a pointing device. Additionally, suitable examples of user outputs include indicator lights, such as LEDs, or even alphanumeric displays, such as liquid crystal displays. Examples of specific user inputs provided to adapter 116 include: a technician pressing a button to power up the adapter; a technician pressing a button to engage wireless communication; a technician pressing a button to initiate or end a communication session with a specific wireless field device; a technician pressing a button or using a keypad to select a wireless process communication device for communication; and/or a user pressing a button to power the adapter down. Examples of outputs or displays presented to a technician include: an indication (whether provided via an indicator light, or via an alphanumeric display) indicating that the adapter is on; an indication that the adapter is operating on an acceptable level of battery power; an indication relative to the amount of battery power stored within the adapter; an indication that the wireless communication module is engaged; an indication that the wireless communication module has identified one or more field devices; specific indications of the individual field devices enumerated; feedback relative to technician inputs via the button or keypad; an indication of correct coupling to wired terminals of a handheld field maintenance tool; or any other suitable indications.

Figure 5:
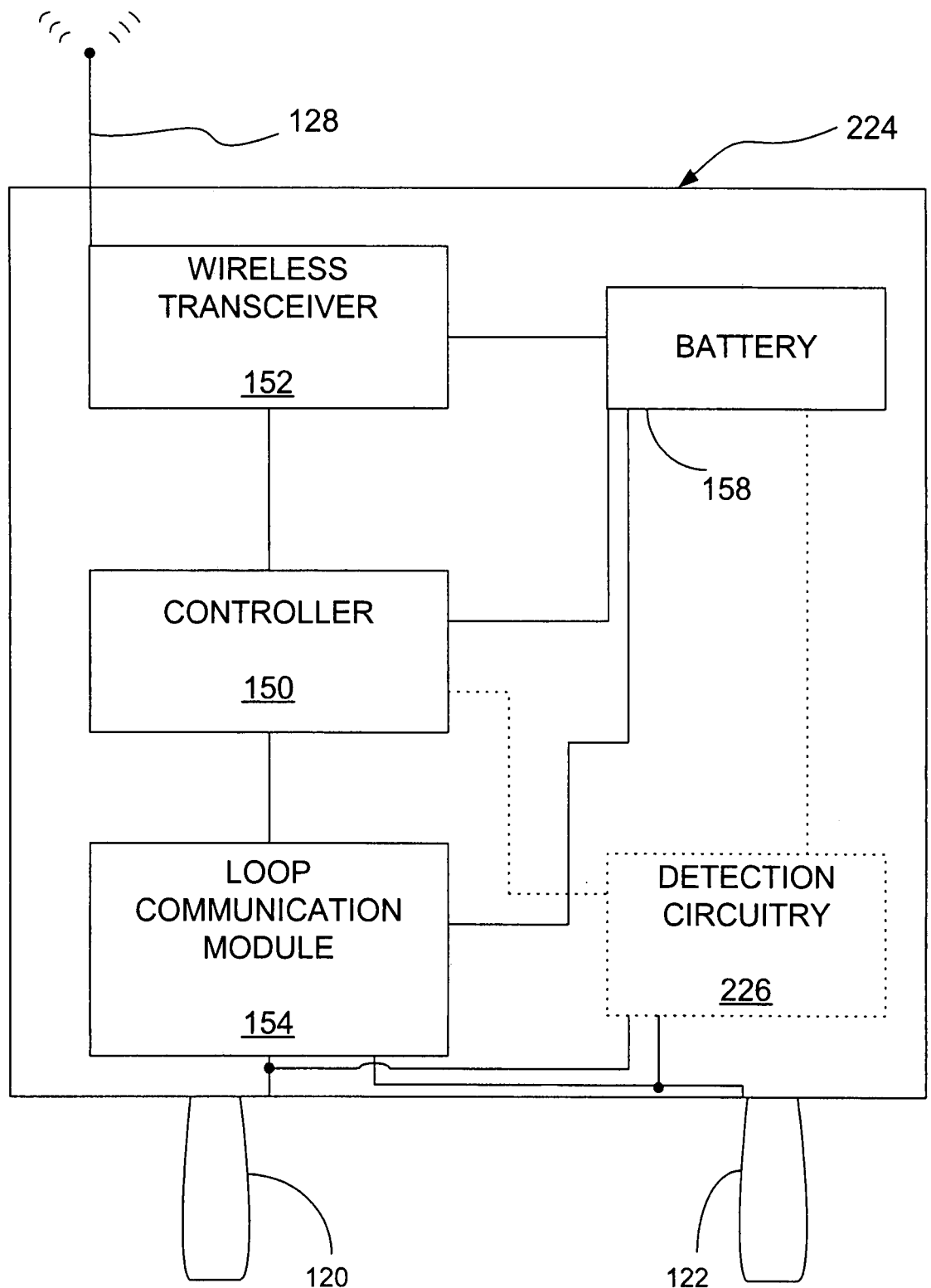
FIG. 5 is a diagrammatic view of electronic circuitry of a wireless process communication adapter in accordance with another embodiment of the present invention.

FIG. 5 is a diagrammatic view of electronics of a wireless process communication adapter in accordance with another embodiment of the present invention. Electronics 224 is similar to electronics 124 (shown in FIG. 4) and like components are numbered similarly. The embodiment illustrated in FIG. 5 differs from that illustrated in FIG. 4 in that circuitry 224 includes optional detection circuitry 226. While circuitry 224 is not shown as including optional user interface 156 (shown in FIG. 4) embodiments of the present invention do include the utilization of both optional user interface 156 and optional detection circuitry 226.

Detection circuitry 226 is coupled to battery 158 and controller 150, as well as plugs 120, 122. Detection circuitry 226 includes suitable measurement circuitry to sense voltage across, or current passing through, terminals 120, 122. Detection circuitry 226 is particularly useful in combination with handheld field maintenance tools that are able to communicate in accordance with two or more wired process communication protocols. Such tools include that sold under the trade designation Model 375 Field Communicator, available from Fisher-Rosemount Systems, Inc. of Eden Prairie, Minn. That particular tool includes a pair of terminals that communicate in accordance with the wired HART® Protocol, and a pair of terminals that communicate in accordance with the FOUNDATION™ Fieldbus Protocol. The two pairs of terminals share a common ground, accordingly three terminals are provided on the tool. Given that this process communication adapter 116 includes a single pair of plugs 120, 122, it is possible that adapter 116 could be placed erroneously upon the wrong terminals of a handheld field maintenance tool, or placed in an incorrect polarity.

Methods for determining which type of wired process communication protocol a device is coupled to are known. Specifically, U.S. Pat. No. 7,027,952 teaches a data transmission method for a multi-protocol handheld field maintenance tool. Accordingly, detection circuitry 226 may include a circuit that can sink a small amplitude, short duration current across the process communication terminals. The detection circuitry can further include circuitry to measure DC voltage, communications signal amplitude, as well as include appropriate signal conditioning circuitry. If controller 150, by virtue of its connection through detection circuitry 226, measures a non-zero voltage across plugs 120, 122, controller 150 first determines the magnitude of the voltage. A HART® process control loop will cause a voltage between approximately 12 and 50 volts DC to be measured, while a FOUNDATION™ Fieldbus loop connection will cause a voltage between approximately 9 and 32 volts D/C to be measured. Once a DC voltage is recognized, the polarity is measured to determine whether plugs 120, 122 are coupled, with correct polarity, to the handheld field maintenance tool. If the polarity is incorrect, a suitable indication, via user interface 156, is generated. However, for HART® connections, polarity does not matter.

As indicated above, there is an overlap between the operating DC voltages used on both HART® and Fieldbus process communication loops. Therefore, DC voltage alone cannot be used to reliably indicate the type of process communication terminals to which wireless process communication adapter 116 is connected. To determine the loop type for the terminals, detection circuitry 226 measures the DC impedance of the connection. Circuitry 226 measure DC impedance by sinking one milliamp of current for a short duration, such as 5 milliseconds. This disturbance generates a voltage pulse that is proportional to the DC impedance of the wired connection itself. There is a distinguishing range of impedance between HART® and FOUNDATION™ Fieldbus process connections. Additionally, or alternatively, in embodiments where yet a different wired process communication protocol is employed, various techniques for measuring and disambiguating the loop protocol type are contemplated. If the detected communication protocol type accords with the type of wired process communication for which loop communication module 154 is designed, then operation begins normally. However, if they do not match, a suitable indication, generated locally, either via an indicator on adapter 116, or through the tool 102 itself is generated.

Figure 6:
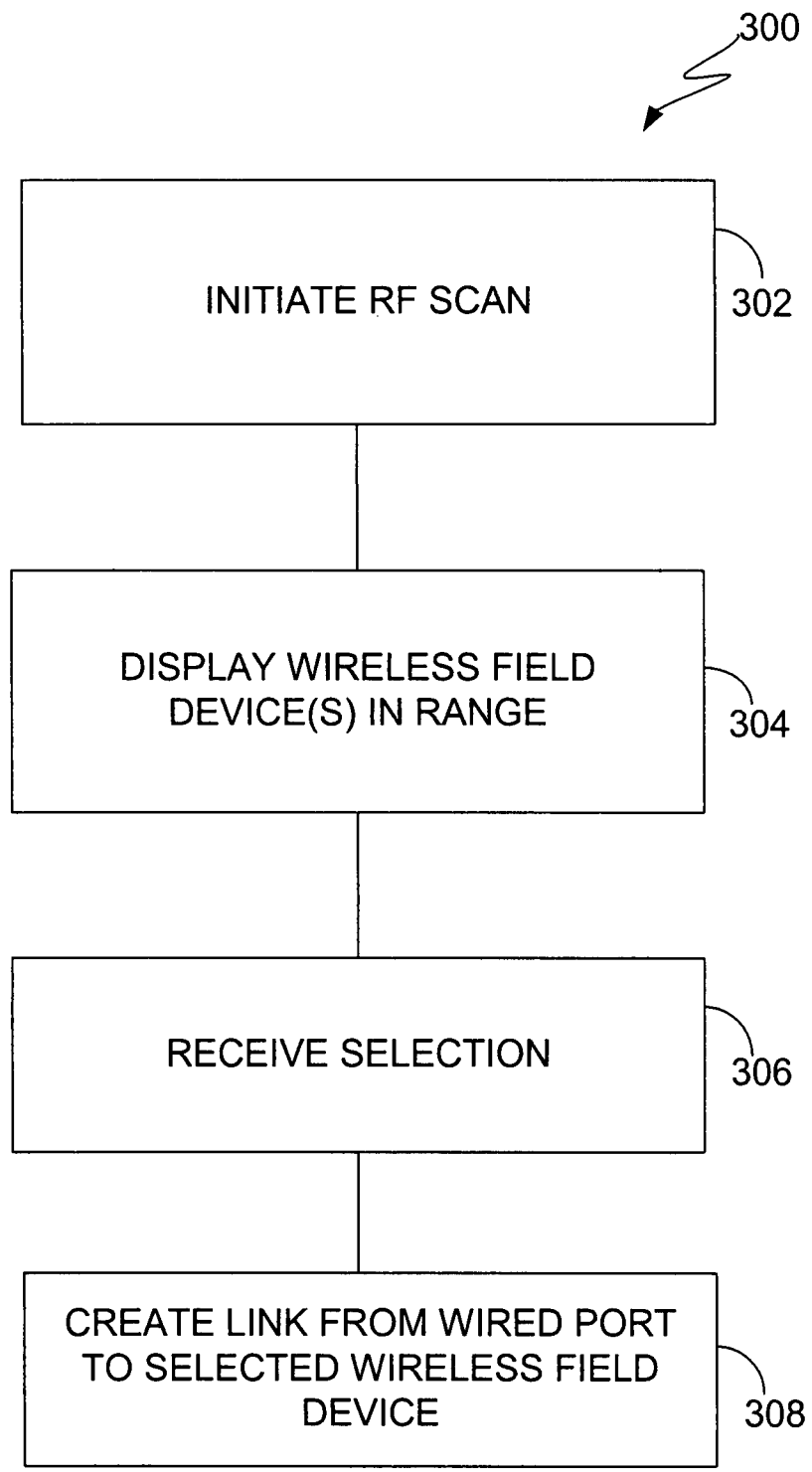
FIG. 6 is a flow diagram of a method of using a wireless process communication adapter in accordance with an embodiment of the present invention.

FIG. 6 is a flow diagram of a method of operating a handheld field maintenance tool with a wireless process communication adapter in accordance with an embodiment of the present invention. Method 300 begins at block 302 where the wireless process communication adapter initiates an RF scan. Step 302 can be done before the adapter is actually coupled to handheld field maintenance tool, or after the two have been coupled together. Step 302 generates wireless signals to identify any and/or all wireless field devices within wireless communication range of the adapter 116. Next, at block 304, identified wireless field devices that are within range of the wireless process communication adapter are displayed. The wireless field devices can be displayed via optional user interface 156, or via a user interface on the handheld field maintenance tool 102. If multiple such field devices are displayed, the method, at block 306, can receive a selection from a user or technician with respect to which wireless field device the technician would like to communicate with. Once the selection has been received, preferably via optional user interface 156, control passes to block 308 where a wireless process communication adapter creates a link from the wired port via terminals 120, 122 to the selected wireless field device. In this regard, the wireless process communication adapter can emulate, via its wired connection to the handheld field maintenance tool, the exact wired signals that the selected wireless field device would generate if it were connected via the wired connection. In this manner, in at least some embodiments of the present invention, the handheld field maintenance tool 102 need not even know that it is not communicating via a direct wired connection to a field device. However, it is expressly contemplated, and presently preferred, that the handheld field maintenance tool 102 may have, or receive, a software update to address the different data link layer timers for wireless process communication versus wired process communication. For example, with respect to the HART® Protocol, there is a different data link layer timer required for wireless HART® communications in comparison to wired HART® communications.

Embodiments of the present invention generally allow handheld field maintenance tools that were previously only able to communicate via their wired process communication port, to now communicate wirelessly to a new generation of wireless field devices. Additionally, such handheld field maintenance tools are still able to make all of the wired connections and interactions that they previously could.

Although the present invention has been described with reference to preferred embodiments, workers skilled in the art will recognize that changes may be made in form and detail without departing from the spirit and scope of the invention.

What is claimed is:

1. A wireless process communication adapter for coupling to a handheld field maintenance tool, the wireless process communication adapter comprising:
   a plurality of plugs sized and spaced to mate with lead terminals of the handheld field maintenance tool, wherein the handheld field maintenance tool is adapted to allow an operator to communicate with a field device through the lead terminals, the field device measures and/or controls an industrial process;
   a loop communication module operably coupled to the plurality of plugs, the loop communication module being configured to communicate digitally with the handheld field maintenance tool in accordance with a process loop communication standard protocol through the plugs;
   a controller coupled to the loop communication module, the controller configured to transform at least one message received from the handheld field maintenance tool through the loop communication module to at least one corresponding wireless protocol packet;
   a wireless communication module coupled to the controller and configured to receive the at least one corresponding wireless protocol packet, generate a wireless signal based upon the at least one wireless protocol packet, and wirelessly communicate the signal to the field device; and
   wherein, the loop communication module, controller, and wireless communication module are disposed within a portion of the adapter that fits substantially between a width of a distance between the lead terminals.

2. A handheld field maintenance system comprising:
   a handheld field maintenance tool having a keypad comprising a plurality of keys, a display, and a plurality of lead terminals, wherein the handheld field maintenance tool is adapted to allow an operator to communicate with a selected wireless field device through the coupling of the lead terminals to the field device or a process control loop to which the field device is coupled; and
   a wireless process communication adapter comprising:
      a plurality of plugs coupled to respective lead terminals of the handheld field maintenance tool;
      a loop communication module operably coupled to the plurality of plugs, the loop communication module being adapted to communicate digitally with the handheld field maintenance tool in accordance with a process loop communication standard protocol through the plurality of plugs;
      a controller coupled to the loop communication module, the controller adapted to transform at least one message received from the loop communication module to at least one corresponding wireless protocol packet; and
      a wireless communication module coupled to the controller and adapted to receive the at least one corresponding wireless protocol packet and generate a wireless signal based upon the at least one wireless protocol packet; and
      wherein the wireless process communication adapter is configured to perform an RF scan to identify wireless field devices within range of the wireless process communication adapter, wherein the selected wireless field device is one of the identified wireless field devices.

3. The system of claim 2, wherein the wireless communication module is configured to receive a radio-frequency signal and provide data indicative of the signal to the controller, and wherein the controller is configured to generate a wired process communication message, and convey the message to the loop communication module, and wherein the loop communication module is configured to generate digital signals through the plurality of plugs in accordance with a wired process communication standard protocol based upon the message.

4. The system of claim 2, and further comprising a power source disposed within the adapter, the power source being coupled to the wireless communication module, the controller and the loop communication module.

5. The system of claim 4, wherein the power source is a battery.

6. The system of claim 5, wherein the battery is rechargeable.

7. The system of claim 2, and further comprising a user interface coupled to the controller.

8. The system of claim 7, and further comprising detection circuitry coupled to the controller and to the plurality of plugs, the detection circuitry being configured to detect a loop type of a device coupled to the plurality of plugs.

9. The system of claim 2, wherein the loop communication module is configured to communicate by superimposing a digital signal upon an analog current, and to communicate at a rate of approximately 1.2 kilobits/second.

10. The system of claim 2, wherein the loop communication module is configured to communicate at a rate of approximately 31.25 kilobits/second.

11. The system of claim 2, wherein the wireless communication module communicates at a frequency of about 2.4 gigahertz (GHz).

12. The system of claim 2, wherein both the handheld field maintenance tool and the wireless process communication adapter are intrinsically safe.

13. The system of claim 2, wherein the handheld field maintenance tool and the wireless process communication module communicate in accordance with a wired process communication standard protocol.

14. The system of claim 13, wherein the protocol is the HART protocol.

15. The system of claim 13, wherein the protocol is the FOUNDATION Fieldbus Protocol.

* * * * *